Oct. 8, 1940.  J. HANSEN  2,217,407

JOINT FOR FLEXIBLE ARMS

Filed Dec. 17, 1936  2 Sheets-Sheet 1

INVENTOR
JESPER HANSEN
BY Harry Lea Dodson
ATTORNEY

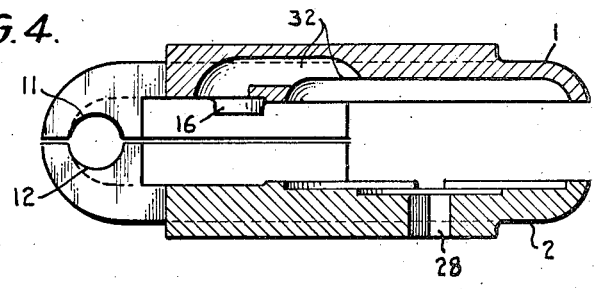
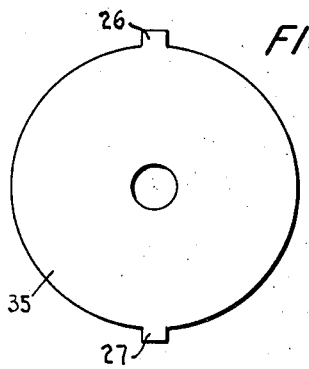
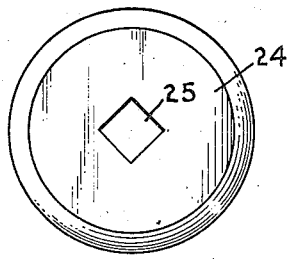
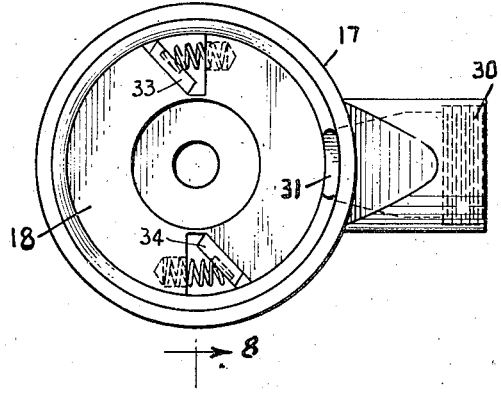
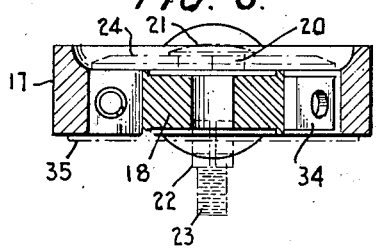
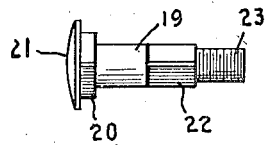

Patented Oct. 8, 1940

2,217,407

UNITED STATES PATENT OFFICE 2,217,407

JOINT FOR FLEXIBLE ARMS

Jesper Hansen, Decatur, Ill., assignor to Faries Manufacturing Company, Decatur, Ill., a corporation of Illinois Application December 17, 1936, Serial No. 116,357

6 Claims. (Cl. 285—9)

My invention relates to that class of devices which are designed to permit vertical and horizontal adjustment of the arms to a desired position.

The principal object of my invention is to provide a joint which will permit of both vertical and horizontal movement at the will of the operator.

A further object is to provide means to permit free movement vertically in one direction but to restrict its motion in the other.

A further object is to provide an adjustable frictional resistance to such movement whereby the friction can be regulated. Other objects will appear in the hereinafter contained description.

My means of accomplishing the foregoing objects may be more readily understood by having reference to the accompanying drawings, which are hereunto annexed and are a part of this specification, in which Fig. 1 is a top or plan view of my improved joint;

Fig. 4 is a detail view of half of the casing;

Fig. 5 is a side view of one of the friction washers;

Fig. 6 is a similar view of the other;

Fig. 7 is a fragmentary detail view in elevation of the clutch mechanism;

Fig. 8 is a section taken on the line 8—8 in Fig. 7; and

Fig. 9 is a detail of the axle.

Similar reference numerals refer to similar parts throughout the entire description.

Figure 1:
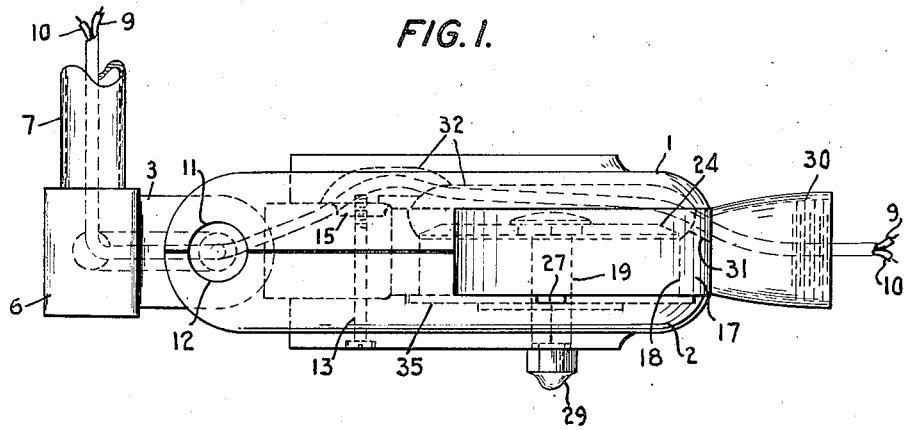
Figure 2:
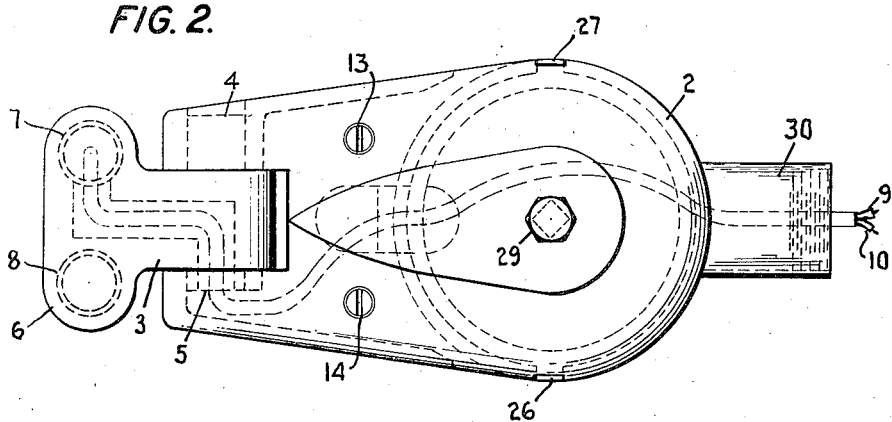
Fig. 2 is a side elevation of the same.
Figure 3:
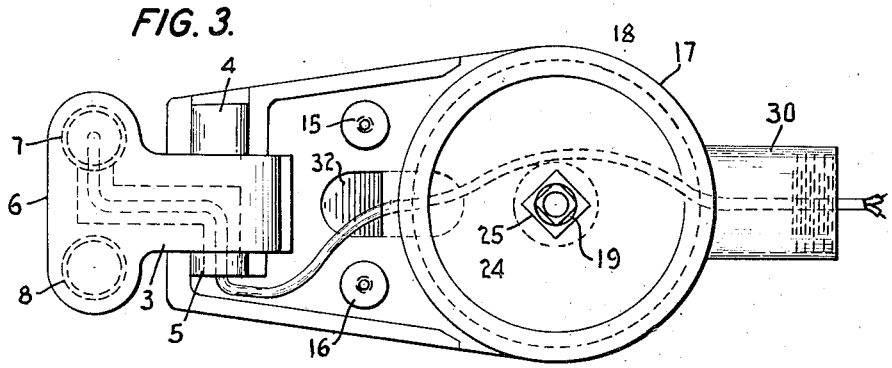
Fig. 3 is a side elevation with one side of the casing removed.

As shown in the drawings my joint is enclosed in a casing found in two parts 1 and 2, carries trunnion 3, the journals 4 and 5 of which are preferably formed of tubing. The trunnion 3 has a base 6 to which may be attached tubes 7 and 8 to form the arm. One of these tubes may be used as a conduit for electrical conductors 9 and 10. Bearings 11 and 12 are formed in the halves 1 and 2 of the casings and are fitted to and coincide with the journals 4 and 5, so that the casing is free to swing horizontally in either direction. The halves 1 and 2 are secured in place by means of screws 13 and 14 which are threaded in sockets 15 and 16 cast or formed on the inside of the half 1. At the outer end of the halves 1 and 2 I mount an annular member 17 which is rotatably mounted on a disc clutch 18. This clutch rotates on an axle 19 mounted in the half 2 of the casing. The axle 19 is formed with a squared portion 20 adjacent its head 21 and a reduced squared portion 22 adjacent its threaded end 23. A friction disc 24, having a square hole 25 in its center to fit the squared portion 20 of axle 19, is mounted on one side of the clutch 18. The disc 18 is narrower than the annular member 17 so that ample room is provided for the disc 24 and the head 21 of the axle 19, without it contacting the wall of the half 1 of the casing. A disc 25 is mounted at the other side of the clutch 18, but it is larger in diameter than the disc 24, and engages the edge of the annular member 17. This disc is provided with two peripheral lugs 26 and 27 which fit corresponding notches in the half 2 of the casing. This half of the casing has a square opening 28 to which is fitted the squared portion 22 of the axle 19. It will be clear from the foregoing that when assembled, by tightening the nut 29 on the threaded portion 23 of the axle 19 that any desired frictional resistance can be obtained.

An outwardly extending cylindrical lug 30 is formed or otherwise secured to the annular member 17. This lug may be provided with threads for mounting the tube of the arm (not shown). As illustrated they are internal threads but obviously they can be either internal or external as desired.

A passage 31 is formed in the annular member 17, and leads to the inside of the lug 30 for the electrical conductors 9 and 10. A recess 32 is formed in the wall of the half 1, so that the conductors 9 and 10 will not contact the annular member 17 as it swings on its axle, thus all danger of chafing the insulation of the electrical conductors is avoided.

The trunnion 3 and its base 6 is formed with a passage therethrough, leading to an opening in the tube which forms the journals 4 and 5, this permits the electrical conductors 9 and 10 to pass through the tube 7, the base and trunnion 3 through the journal 5 into the casing, whence they can be led through the recess 32 and passage 31 into the lug 30 as clearly seen in the drawings.

As illustrated the clutch is provided with two spring pressed dogs 33 and 34, though any other form of clutch mechanism may be used. These dogs engage the inner surface of the annular member 17, when it is rotated in one direction and resist such motion; while it is perfectly free to move in the opposite direction.

I have described with some degree of particularity my device, but such description is solely to describe a concrete embodiment of my invention and should not be regarded as limitation, except as such limitations appear in the claims.

Having described my invention, what I regard as new and desire to secure by Letters Patent is:

1. In a joint for flexible arms for lighting fixtures, a casing comprising two mating halves, a rib on one of said halves, one of said halves being provided with a groove in said rib for the reception of electrical conductors, an annular member rotatably mounted in bearings formed in the side walls of said casing, a peripheral lug on said member adapted to swing between said halves, said lug adapted to receive a conduit, a disc mounted in said member, said disc being provided with notches cut in its periphery, a dog in each notch, springs to hold the dogs in engagement with the wall of said member whereby said disc is stationary when the annular member moves in one direction but moves in said member when said annular member moves in the opposite direction, means to hold said disc in said member, friction means mounted intermediate the casing and the notched disc, a hollow trunnion mounted in the end of said casing through which electrical conductors may pass.

2. In a joint for flexible arms for lighting fixtures, a casing comprising two mating halves, a rib on one of said halves, one of said halves being provided with a groove in said rib for the reception of electrical conductors, an annular member rotatably mounted in bearings formed in the side walls of said casing, a peripheral lug on said member adapted to swing between said halves, said lug adapted to receive a conduit, a disc mounted in said member, said disc being provided with notches cut in its periphery, a dog in each notch, springs to hold the dogs in engagement with the wall of said member, means to hold said disc in said member, a hollow trunnion mounted in the end of said casing through which electrical conductors may pass, means to frictionally restrain said disc from free movement, means to vary the frictional resistance to such rotation, said means to frictionally restrain said disc comprising a pair of discs one of which is mounted intermediate the annular member and a side of the casing the other bearing against the notched disc inside of said annular member.

3. In a joint for flexible arms for lighting fixtures, a casing comprising two mating halves, a rib on one of said halves, one of said halves being provided with a groove in said rib for the reception of electrical conductors, an annular member rotatably mounted in bearings formed in the side walls of said casing, a peripheral lug on said member adapted to swing between said halves, said lug adapted to receive a conduit, a disc mounted in said member, said disc being provided with notches cut in its periphery, means mounted in said notches which engage said member when rotated in one direction but do not when rotated in the opposite, means to hold said disc in said member, friction means mounted intermediate the casing and the notched disc, a hollow trunnion mounted in the end of said casing through which electrical conductors may pass.

4. In a joint for flexible arms for lighting fixtures, a casing comprising two mating halves, a rib on one of said halves, said half being provided with a groove in said rib for the reception of electrical conductors, an annular member rotatably mounted in bearings formed in the side walls of said casing, a peripheral lug on said member adapted to swing between said halves, said lug adapted to receive a conduit, a disc mounted in said member, said disc being provided with notches cut in its periphery, a dog in each notch, springs to hold the dogs in engagement with the wall of said member, means to hold said disc in said member, a hollow trunnion mounted in the end of said casing through which electrical conductors may pass, an axle on which said disc rotates, said axle having a head and a squared portion adjacent its head, a friction disc provided with a square hole in its center mounted on said axle at one side of said rotatable disc, a second disc, provided with two diametrically opposite peripheral lugs, mounted at the other side of said rotatable disc, one-half of said casing being provided with notches to receive said lugs.

5. A swivel joint including a pair of companion shaped marginally abutting shell members separably secured together in the formation of a housing and being cut away along a portion of their periphery in the provision of an aperture, a ratchet member rotarily mounted on the inner face of one of said shell members, a bracket-supporting member operably mounted on the ratchet for unidirectional rotary motion therearound, said bracket-supporting member having bracket-engaging means extending outwardly through the housing aperture, and adjusting means engaging said ratchet member for frictionally restraining the freedom of rotation of the ratchet member with respect to the shell member on which it is mounted.

6. A swivel joint including a pair of companion shaped marginally abutting shell members cut away along a portion of their periphery in the provision of an aperture, a ratchet member rotarily mounted on the inner face of one of said shell members, and a bracket-supporting member operably mounted on the ratchet for uni-directional rotary motion there-around, said bracket-supporting member having bracket-engaging means extending outwardly through the aperture.

JESPER HANSEN.